United States Patent [19]

Lindgard

[11] Patent Number: 4,732,766

[45] Date of Patent: Mar. 22, 1988

[54] BAIT

[76] Inventor: Knud Lindgard, 448 Iliwahi Loop, Kailua, Oahu, Hi. 96734

[21] Appl. No.: 710,572

[22] Filed: Apr. 15, 1985

Related U.S. Application Data

[63] Continuation-in-part of Ser. No. 503,586, Aug. 10, 1983, abandoned.

[51] Int. Cl.$^4$ .............................................. A23K 1/18
[52] U.S. Cl. ........................................ 426/1; 426/94; 426/623
[58] Field of Search ................... 426/1, 94, 623, 630, 426/641, 807, 90, 132, 133, 295

[56] References Cited

U.S. PATENT DOCUMENTS

| | | | |
|---|---|---|---|
| 2,874,048 | 2/1959 | Walldov | 426/1 |
| 3,322,544 | 5/1967 | Yakstis | 426/1 X |
| 3,421,899 | 1/1969 | Humphreys | 426/1 |
| 3,428,459 | 2/1969 | Hinds | 426/1 |
| 3,607,295 | 9/1971 | Morgan | 426/1 |
| 3,684,519 | 8/1972 | Combs | 426/1 |
| 4,393,087 | 7/1983 | Sullins et al. | 426/74 |
| 4,400,399 | 8/1983 | Muller | 426/1 |
| 4,463,018 | 7/1984 | Carr | 426/1 |
| 4,551,377 | 11/1985 | Elves et al. | 426/132 |

FOREIGN PATENT DOCUMENTS

| | | | |
|---|---|---|---|
| 49-046759 | 11/1974 | Japan | 426/1 |
| 0135531 | 10/1980 | Japan | 426/1 |
| 0196146 | 10/1985 | Japan | 426/90 |

OTHER PUBLICATIONS

Fishery Leaflet 28 "Fish Baits", Sep. 1946, pp. 1 and 17.

*Primary Examiner*—R. B. Penland

[57] ABSTRACT

A bait consisting of a bread crumb containing a reticulate and resilient web of plastic monofilaments which act synergistically with the gluten of the bread crumb to form a resilient structure, which, while still permeable by water is practically impervious to dissolution in water unless masticated. The buoyancy of the bait may be influenced by the application of pressure, or the omission thereof, to release gas bubbles trapped in the bait because of the resilient structure.

6 Claims, 7 Drawing Figures

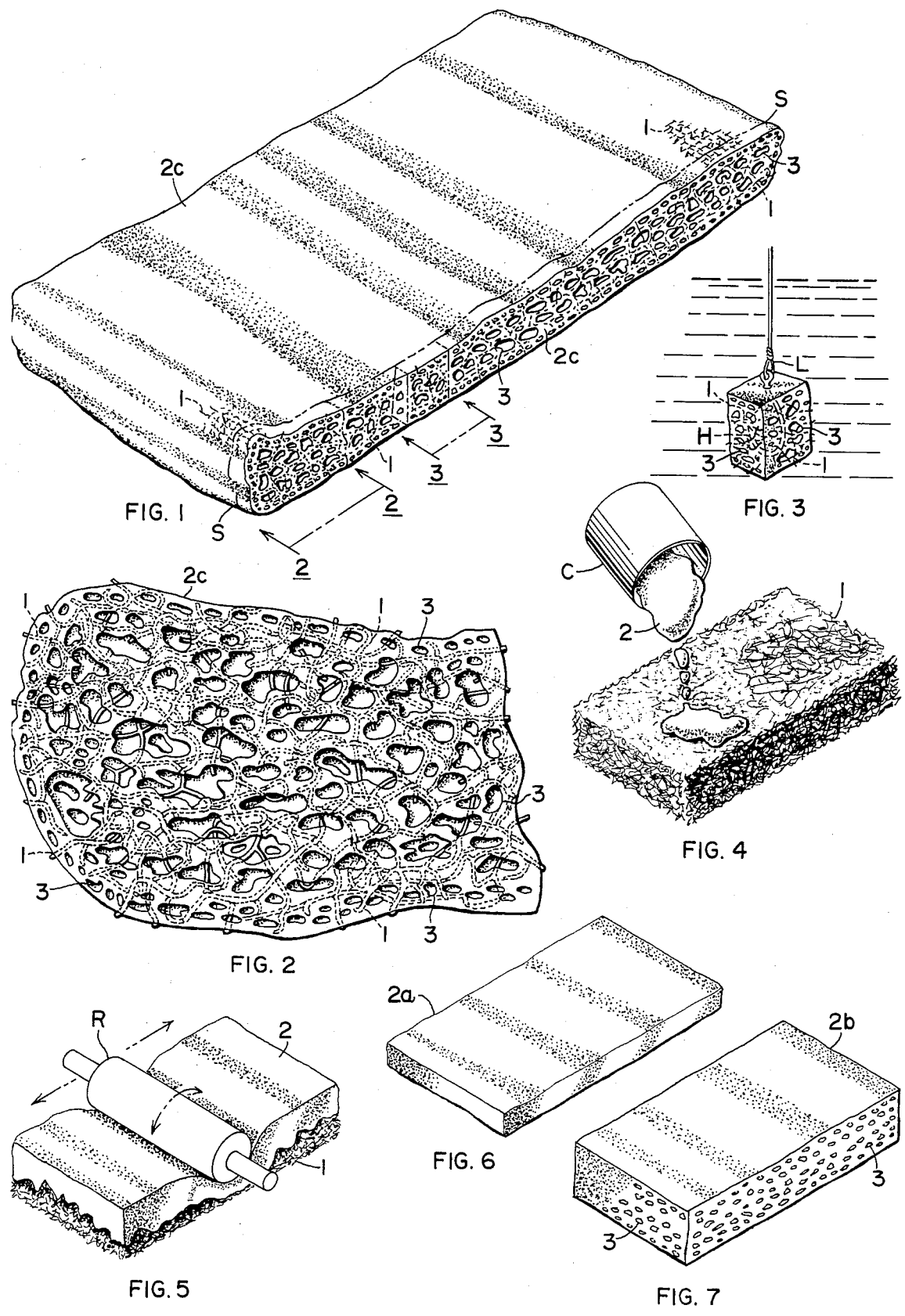

BAIT

This is a continuation-in-part of patent application Ser. No. 503,586 filed Aug. 10, 1983, now abandoned.

BACKGROUND AND OBJECTS OF THE INVENTION

Heretofore, various dough and bread mixtures have been a preferred bait for catching fish by conventional methods. Bread, alone, is an outstanding bait; however, it is fragile and lacks tensile strength. This is because ordinary bread is composed of soluble as well as non soluble substances. A non soluble substance in bread is the gluten, a tough albuminous protein that gives bread dough cohesiveness and the ability to retain gas when leavened.

It is my invention to fortify the gluten with ultra fine plastic monofilaments while still preserving the characteristics of the gluten to produce a bait which looks, acts, smells, and feels the same as ordinary bread, but is practically impervious to dissolution in water unless masticated.

The importance of baits containing matters or substances which effuse readily in water is grossly overstated within the art of fishing. Fish, contrary to humans, do not operate in a gaseous environment and therefore do not have an olfactive sense readily understandable by humans. Fish must rely on detecting substances carried by water molecules and in this regard have little difficulty in operating in threshold levels of $10^{-9}$ molecular concentrations. As a matter of fact, it has been proven that some fish can actually detect one molecule among $10^{15}$ molecules. Fish then, do not detect the presence of substances by a smell sense similar to humans but can actually differentiate between such different chemicals as amino acids, proteins, peptides, sugars and specific compounds within these, all of which may be found in bread.

It is my invention to chemically tag plastic monofilaments in a bread crumb so that these appear to be a natural part of the bread as far as the fish are concerned.

This is possible because plastics are not solids as commonly thought. Plastic filaments, as used in this invention, are actually macro-molecular chains through which water molecules, among other, pass with relative ease. I have found that the albuminous protein chains in flour, called gluten, in contrast to carbohydrates, attach readily to plastic polymers such as the example of polyester monofilaments used in this invention. In doing so the physical properties of either substance are not altered but the gluten and the filaments work together synergistically to provide a very tough bait as disclosed hereafter.

Fish do not feed by taste alone, but also by form, color, shape and texture of potential food. I have observed that fish will often carefully mouth a bait several times, inhaling and expelling it, before swallowing same. Ordinary bread, impaled on a hook, quickly succumbs to such mouthing. The bait, as invented, is so resistant to this mouthing that several fish have actually been caught on the same piece of bait used successively.

Normally, the presence of a different substance within a known food would cause the defense mechanism of the fish to become alert. This invention circumvents this defense mechanism by chemically tagging, as explained above, and also by using ultra fine monofilament as small as 6-15 denier in size. The preferred size filament appears to be about one third the diameter of a human hair when viewed under a microscope.

I found these properties in a material which is new in commerce. Technically it is called interfacing or insulation. It consists of a resilient, non woven, long staple, multifilament polyester web which lofts to about 550 cubic inches to the ounce. It may be found readily in the commerce in rolls stated to be 3, 5, or 8 ounces to the square yard. Excellent results have been achieved with all.

It would be thought that plastics would melt at ordinary baking temperatures; however, I found that the plastic filaments merely soften and generally follow the structure of the gluten when it is leavened, and hence settles in the pattern of the bread crumb. This is perfect because it is an object of this invention to create a bait to resemble bread as faithfully as possible.

I have found that by virtue of the gluten and the resilient plastic monofilaments of the web acting synergistically, the invented bait contains gas bubbles, as cavities, just as ordinary bread. These trapped gas bubbles make the bait buoyant and when fresh it will float even when containing a hook. It is my invention that my bait can be floated, or, because of its resiliency when squeezed lightly under water to release part of the gas trapped in the bait, it can be made to suspend or sink in the water. This feature is a unique, invented function of my bait which cannot be duplicated by ordinary bread or doughballs and which will be recognized as very useful by experienced anglers because it reduces requirements for floats and sinkers and provides for a natural presentation.

Ordinary bread will stale and mildew even when adding mold retardants such as calcium proprionate. For this reason I prefer to dry my bait until most of the water, not molecularly held, has evaporated. By doing so I have increased the shelf life of my bait to more than a year.

Human handling of bait often imparts to this an amino acid, L-Serine, which has been proven distasteful to fish. For this reason a masking scent, or lure, may be added to my bait such as cumin oil, anise, garlic or herring oil and extracts. Such scents may also be added by any user.

When my bait is dried as described above, it may be reconstituted to bread consistency by briefly dunking in water. Ordinarily a piece of dried bait will reconstitute within 1 to 3 minutes.

My bait may also be dyed using common vegetable dyes. I found that by coloring the leavening solution, the dyes penetrated best the gluten and the web, and thus provided uniform coloring which did not leach into the water or stain the hands of the user.

To make my bait, as an example, I employ the following:

EXAMPLE

| | |
|---|---|
| Flour | 140 grams |
| Water | 250 grams |
| Yeast, fresh | 28 grams |
| Plastic web (see below) | 5 grams |
| Masking scent | 1 gram |
| Calcium propionate | 2 grams |

The plastic web in the example is that found in American commerce as interfacing, 5 ounces to the square yard. In this case, the physical size would be 1 inch×7 inches×7 inches or approximately 49 cubic inches in loft. These ingredients are mixed in the manner as described in the specifications to follow.

SPECIFICATIONS

Other objects will appear from this description, the claims attached thereto and from the drawings wherein:

FIG. 1 is a perspective view of a block of bait according to the present invention.

FIG. 2 is an enlarged sectional view through the bait substantially on line 2—2 of FIG. 1.

FIG. 3 is a perspective view of the bait as it appears in use.

FIG. 4 is a perspective view of the block of plastic web and the container with the batter ready to begin manufacture.

FIG. 5 is a perspective view of the incorporation of the batter into the plastic web.

FIG. 6 is a perspective view of the intermediate product.

FIG. 7 is a perspective view of the leavened product ready for baking.

Referring to the drawings in detail, the bait constituting the present invention has been generally designated at FIG. 1. A resilient multifilament, non woven, plastic web consisting of monofilaments 1 are shown homogenously and reticulately contained within the breadcrumb 2c. Alveolar cavities, or gas bubbles, are shown as item 3. A strip S has been removed to show the internal features of the finished bait block.

FIG. 2 is a longitudinal view of the bait substantially on line 2—2 of the strip S of FIG. 1. The view has been enlarged to better show the details of the bread crumb 2c and the monofilaments 1 of the plastic web. Note that the monofilaments 1 are spread homogenously and reticulately throughout the bread crumb 2c in a pattern which is largely dictated by the bubbles or cavities 3. The filaments 1 extend to and through the surface of the bait. Some filaments 1 are shown visibly as traversing the cavities 3. This occurs when the filaments 1 are only partially attached to the gluten in breadcrumb 2c. In general, most of the filaments 1 are contained physically in the breadcrumb 2c. The randomness of the distributions of the filaments 1 and bread crumb 2c is caused by gas bubbles 3 developed within the gluten of batter 2, FIG. 4 as attached to filaments 1.

FIG. 3 is a view of a piece of bait, as invented, cut from strip S, FIG. 1, substantially on line 3—3. The view shows the bait impaled on a hook H attached to line L. The filaments 1 are practically invisible to the naked eye and the bubbles 3 are intact. This illustration denotes the fact that the bait will seek its own position in the water based on the buoyancy of intact bubbles 3 still trapped within the bait thereby causing the bait to act exactly as an ordinary piece of bread cast upon the waters. By squeezing some of the bubbles 3 out of the bait, or by not doing so, the bait can be made to float, suspend or sink. This is a unique feature that will be appreciated by experienced anglers and an object of this invention.

FIG. 4 shows the pour batter 2 being deposed on the filaments of the block of plastic web by the container C. Item 1 shows the filaments as arranged within the block of plastic web as disclosed.

FIG. 5 shows the pour batter 2 having been distributed evenly on the block of plastic web containing filaments 1. The roller R is being applied to press and fully incorporate the pour batter 2 in order to attach the gluten to the block of filaments 1. The pour batter 2, which escapes from the block of filaments, is reapplied until the entire amount is distributed and sorbed within the block of filaments 1.

FIG. 6 shows the completed operation of rolling the pour batter and filaments into a single rolled down block of batter/web mixture 2a. Note that the height of this block is much less than the block of filaments 1 in FIG. 4. The volume of batter 2, FIG. 4 is lesser than the block of plastic web to allow for the gases ensuing from the subsequent leavening action to expand the rolled down mixture to the former loft of the resilient block of filaments 1. The finite structure and resiliency of the block of filaments 1 allows this orderly leavening whereas loose bulk fibers will lump together and do not achieve the same uniform result for obvious reasons.

FIG. 7 is a view of the block of rolled down batter and web which has rested for the required time to leaven. The batter/web mixture 2b has risen a little higher than the original loft of the filaments 1, FIG. 4, and the bubbles of gas 3 show at the surfaces. This is the block that is then baked conventionally to become the finished product of FIG. 1.

After baking, the block 2c is cut into strips S as shown in FIG. 1. These strips are further dried in a conventional oven to lower the water content and prolong shelf life. To use the bait in the dried state a piece is cut from strip S, such as section 3—3 FIG. 1, which is dipped in water for a few seconds and removed. Because of the hygroscopic properties of the dried bait it reconstitutes within 1-3 minutes. As will herein after appear the invention comprehends the inclusion—or omission—of masking scents, flavorings and mildew retardant chemicals.

The invented bait can be manufactured using the method and the ingredients listed in the example above:

STEP 1. In a container pour 250 cm of water heated to 50 degrees C. Add 15 grams of sugar to the water and stir until dissolved. Add 28 grams of fresh bakers yeast to the water and sugar mixture, stir well and let stand for 10 minutes. After standing, add 2 grams of calcium-propionate and 1 gram of cumin oil.

STEP 2. Cut a block of long staple, multifilament, polyester interfacing measuring about 2.5 cm×19 cm×19 cm, available in commerce as 140 grams (5 ounces) to the square yard. The monofilament size would be 6-15 deniers.

STEP 3. Measure out 140 grams of flour.

STEP 4. Pour leavening mixture from Step 1 into a mechanical mixer or blender. Add flour from Step 3 gradually and mix for 1-2 minutes into a uniform pour batter.

STEP 5. Pour batter unto the plastic web as shown in FIG. 4. Distribute evenly. Using the roller as shown in FIG. 5, work the pour batter into the plastic web as shown until completely sorbed and uniform as shown in FIG. 6.

STEP 6. Place the rolled down web/batter mixture in a lined baking vessel. Let rise for one hour until the batter has doubled in size or has regained the loft of the original plastic web from FIG. 4.

STEP 7. Place the leavened bait in a moderate oven for about 45 minutes or bake at full power in a 650 watt microwave oven for 7 minutes.

STEP 8. Cut finished bait into strips S as shown in FIG. 1 and use, or proceed to next step.

STEP 9. Place strips S in a drying oven at 80 degrees C. for one hour.

The bait can easily be manufactured using the above procedure. It is obvious that the invented bait may also be manufactured using double action baking powder and the baking procedure may also be altered to provide a brown crust. These deviations are considered to be within the realm of the invention.

The use of masking scents, in preference to attractants, is optional to the use of the bait and anyone, including myself, may add their particular fishing "secret".

Since there is no name for a bread wherein the gluten is reinforced with plastic filaments, I have dubbed the invention the name of BREADBAIT and it shall henceforth be known as such.

I claim:

1. As a new article of manufacture, a bait which is practically impervious to dissolution in water unless physically masticated, said bait comprising a bread, said bread made in its simplest form from a natural flour containing gluten and carbohydrates, a liquid, such as water, and a leavening agent, containing a reticulate, resilient arrangement of a multiplicity of plastic monofilaments, said plastic monofilaments being part of a resilient, long staple, multifilament, non woven web, said web acting synergistically with the gluten of the bread by mutual adhesion to form the resilient structure of the bait, said structure being caused by leavening agents producing gas bubbles in the gluten, said gas bubbles being trapped by the intimate combination of the gluten and monofilaments.

2. A bait as defined in claim 1 wherein the plastic monofilaments are polyester fibers.

3. A bait as defined in claim 1 wherein the leavening agent is a natural yeast.

4. A bait as defined in claim 1 wherein the monofilaments are chemically tagged to resemble the bread by sorbing and holding, within their respective macromolecular chain structures, molecules of substances contained in, and produced by, the manufacturing, leavening and baking processes of said bread.

5. A bait as defined in claim 1 wherein the amount of gas bubbles trapped in the bait may be released or reduced by manual pressure applied to the bait while submerged in a liquid thereby changing the relative buoyancy from floating to suspending or sinking.

6. The method of preparing a fish bait comprising the steps of:
   (a) preparing a leavening solution of sugar, water and a leavening agent.
   (b) physically mix the leavening solution with a sufficient quantity of flour containing gluten until a pour batter is formed.
   (c) Rolling the pour batter into a precut resilient block of long staple, non woven plastic monofilaments until most of the gluten from the pour batter has attached to the monofilaments and all of the pour batter has completely sorbed in the remaining spaces of the block.
   (d) Allowing the product thus obtained to rise as determined by the amounts of gases produced by the leavening agent.
   (e) Applying a source of heat until it is solidified into a bread.

* * * * *